(12) United States Patent
Borchard

(10) Patent No.: US 6,415,592 B1
(45) Date of Patent: Jul. 9, 2002

(54) HARVESTER APPARATUS AND METHOD FOR SEPARATING RIPE FRUIT FROM HARVESTED PLANTS

(75) Inventor: Milton Borchard, Woodland, CA (US)

(73) Assignee: California Tomato Machinery, LLC, Crows Landing, CA (US)

( * ) Notice: Subject to any disclaimer, the term of this patent is extended or adjusted under 35 U.S.C. 154(b) by 0 days.

(21) Appl. No.: 09/771,831

(22) Filed: Jan. 29, 2001

(51) Int. Cl.[7] .............................................. A01D 46/00
(52) U.S. Cl. ...................... 56/327.1; 56/16.5; 56/328.1; 460/123
(58) Field of Search ................ 56/10.2 J, 16.4, 56/16.5, 327.1, 328.1, 329; 460/1, 2, 11, 12, 119, 123, 144, 145, 149

(56) References Cited

U.S. PATENT DOCUMENTS

| | | | |
|---|---|---|---|
| 4,033,099 A | * 7/1977 | Friedel et al. ............. | 56/327.1 |
| 4,118,311 A | * 10/1978 | Friedel et al. ............. | 56/327.1 |
| 4,147,017 A | * 4/1979 | Cortopassi et al. ........ | 56/327.1 |
| 4,335,570 A | 6/1982 | Fitzmaunice | |
| 4,570,426 A | * 2/1986 | Bettencourt et al. ....... | 56/327.1 |
| 5,197,269 A | 3/1993 | Meester | |
| 5,316,519 A | 5/1994 | Johnson | |
| 5,573,459 A | * 11/1996 | Meester ...................... | 460/145 |
| 6,257,978 B1 | * 7/2001 | Meester ...................... | 460/145 |

* cited by examiner

Primary Examiner—Robert E. Pezzuto
Assistant Examiner—Nathan Mammen
(74) Attorney, Agent, or Firm—Thomas R. Lampe

(57) ABSTRACT

A harvester system for separating ripe fruit such as tomatoes from harvested plants includes first and second sorters for detecting and sorting loose fruit and accepting or rejecting the loose fruit on the basis of the detected color and a transport conveyor for recycling rejected loose fruit from the second sorter back through the first sorter.

14 Claims, 3 Drawing Sheets

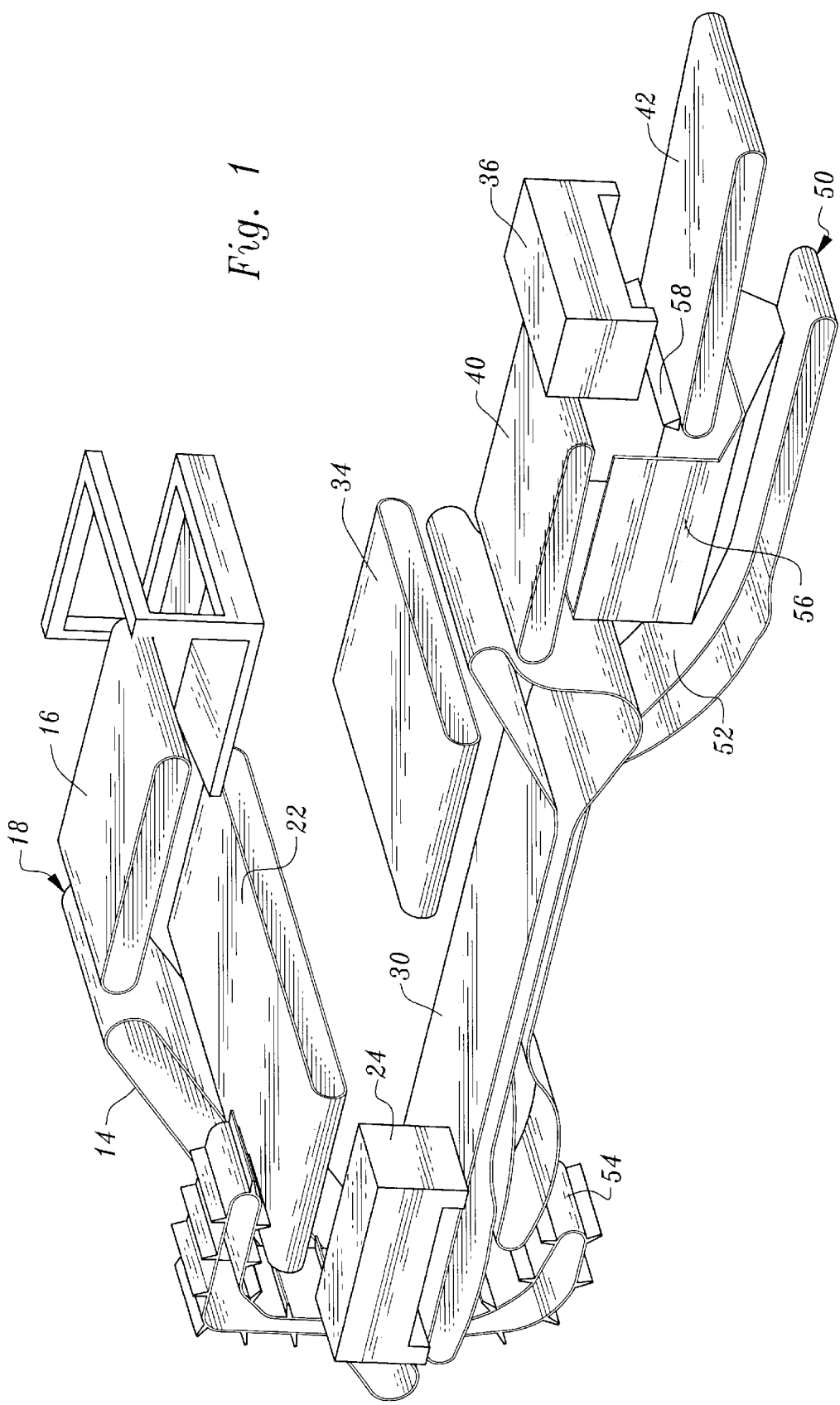

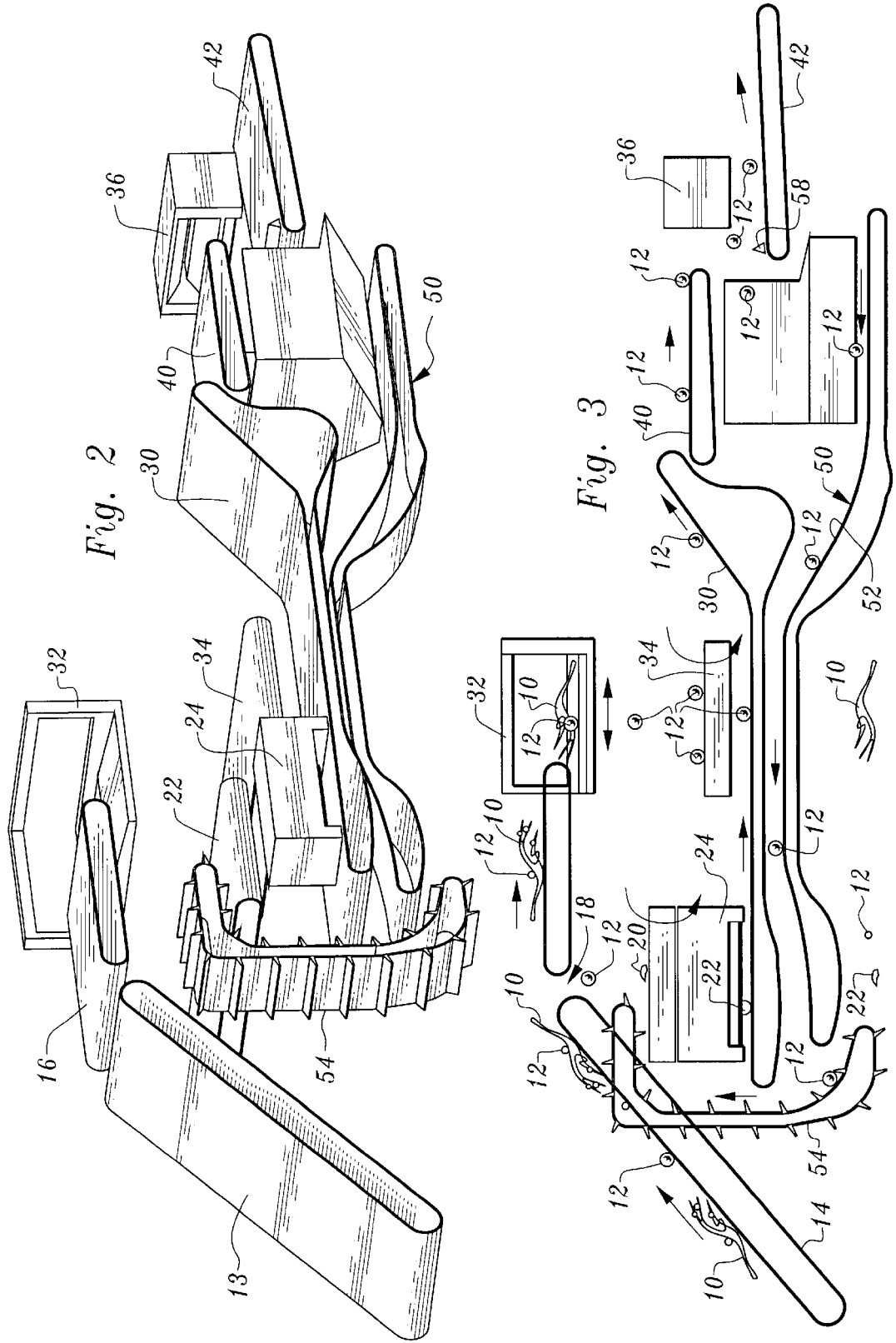

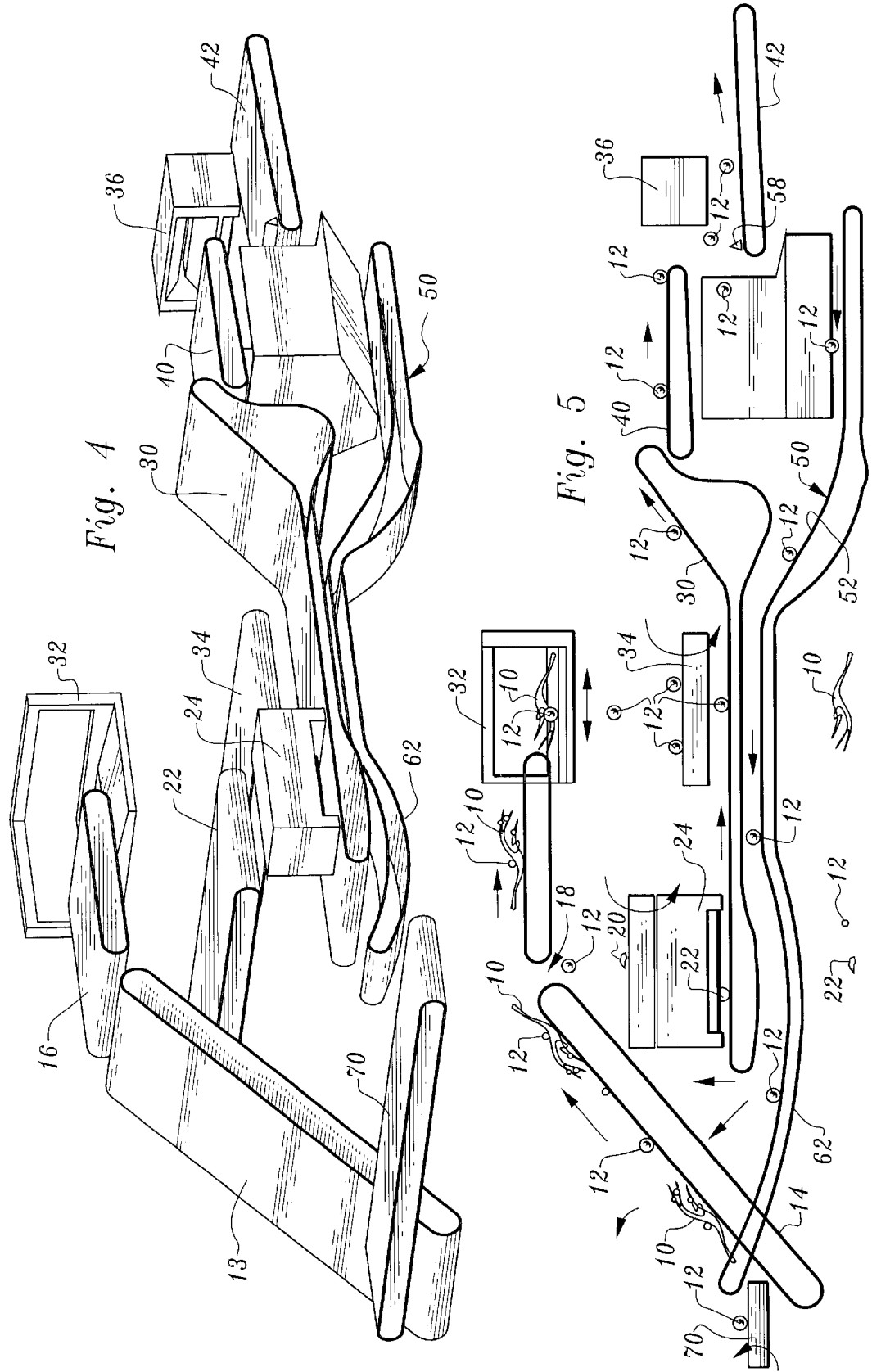

HARVESTER APPARATUS AND METHOD FOR SEPARATING RIPE FRUIT FROM HARVESTED PLANTS

TECHNICAL FIELD

This invention relates to a system for harvesting vine crops, such as tomatoes.

BACKGROUND OF THE INVENTION

Large fields of tomatoes are commonly harvested by self-propelled tomato harvesters. An example of such a harvester is the tomato harvester made available by Johnson Machinery Company, Inc. of Woodland, Calif. A large scale harvester is also sold by California. Tomato Machinery (CTM) of Madera, California. Representative tomato harvesters are also shown in the following United States Patents: U.S. Pat. No. 5,316,519, issued May 31, 1994, U.S. Pat. No. 4,335,570, issued Jun. 22, 1982, and U.S. Pat. No. 5,197,269, issued Mar. 30, 1993.

Large scale tomato harvesters such as those made available by Johnson Farm Machinery Company, Inc. and CTM retrieve the tomato plants or vines from the ground. The tomatoes are separated on the basis of color, the ripe tomatoes accepted and the unripe tomatoes rejected on the basis of color detection by an electronic color sorter including a detector and associated movable fingers or pushers actuated thereby. The detected ripe tomatoes are typically conveyed to a truck alongside the harvester and the detected unripe tomatoes, the rejected tomatoes, are returned to the ground.

It is desirable to capture or retain as many ripe tomatoes as possible but it is inherent in electronic color sorter systems that a certain number of ripe tomatoes will be inadvertently or incorrectly rejected and discarded. There are a number of reasons for this. For example, a ripe or red tomato may be disposed behind an unripe or green tomato when the detection and sorting steps take place, causing the ripe tomatoes to be unintentionally rejected. Also, a tomato may not be red in is its entirety and the sorter system employed may sense a green end rather than a red end and reject the tomato. And, of course, accompanying dirt and vine portions can interfere with the proper operation of the sorter system.

It is known to catch culls or rejected tomatoes on a separate conveyor wherein the culls are further sorted in an attempt to retrieve ripe tomatoes by a totally separate detection and sorter system dealing strictly with the culls. This is an expensive arrangement. Furthermore, the arrangement is relatively inefficient since not only red or ripe culled tomatoes are passed through the separate detector and sorter system along with green or unripe tomatoes, but also dirt, plant portions or other materials other than the tomatoes themselves. In addition, use of a separate conveyor extending between the side conveyors of the harvester machine as is the case with this known prior art can expose people working on the tomato harvester to a greater risk of injury.

DISCLOSURE OF INVENTION

The present invention relates to a system which relatively inexpensively, efficiently and effectively provides for separation of ripe fruit such as tomatoes from the tomato vines. The system employees the existing color detectors and sorters of a tomato harvester to detect and retain ripe or red tomatoes which have been inadvertently included in the culls. The culled red or ripe tomatoes are in effect recycled through the conventional color detector and sorter of the system to attain this result.

The harvester apparatus of the present invention is for separating ripe fruit from harvested plants. The harvester apparatus includes a first separator for separating loose fruit from harvested plants. The apparatus additionally includes a first sorter for sorting loose fruit separated by the first separator by detecting the color thereof and selectively accepting or rejecting the loose fruit separated by the first separator on the basis of the color thereof.

A second separator is provided for receiving harvested plants from the first separator after loose fruit has been separated therefrom by the first separator for separating additional loose fruit from the harvested plants received thereby from the first separator.

A second sorter receives loose fruit from the second separator and sorts the loose fruit received from the second separator by detecting the color of the loose fruit received from the second separator and selectively accepting or rejecting the loose fruit received from the second separator on the basis of the detected color thereof.

Transport means is provided for transporting loose fruit rejected by the second sorter to the first sorter for further sorting by the first sorter.

The present invention also encompasses a method for separating ripe fruit from harvested plants.

Other features, advantages, and objects of the present invention will become apparent with reference to the following description and accompanying drawings.

BRIEF DESCRIPTION OF DRAWINGS

FIG. 1 is a rear, perspective, somewhat schematic view illustrating structural components of the present invention as utilized in a tomato harvester;

FIG. 2 is a front, perspective, somewhat schematic view of the apparatus;

FIG. 3 is a schematic, side view of the apparatus, illustrating tomato plants being processed by the apparatus.

FIG. 4 is a view similar to FIG. 2 showing an alternative embodiment of the invention; and FIG. 5 is a view similar to FIG. 3 of the alternative embodiment.

MODES FOR CARRYING OUT THE INVENTION

Referring now to the drawings, apparatus constructed in accordance with the teachings of the present invention is illustrated. It will be appreciated that the apparatus is part of a large scale harvester machine and that only the portions of such machine pertinent to the present invention are illustrated. When considering the apparatus, the front or leading end of the apparatus is disposed at the left in the drawing figures. The mobile harvesting machine of which the apparatus is a part moves to the left when in operation.

The harvester apparatus is for separating ripe fruit such as tomatoes from harvested plants. FIG. 3 illustrates plants 10 and tomatoes 12 during operation of the apparatus.

After being severed from the ground, the plants 10 are conveyed upwardly by a separator conveyor 14 to a generally horizontally disposed separator conveyor 16. The separator conveyors 14, 16 form a gap 18 through which loose fruit 12 and dirt fall. This span or gap is known in the trade as a "dirt gap". The loose tomatoes 12 and dirt 20 fall onto a sorter conveyor 22, also known as a dirt conveyor.

First sorter or dirt conveyor 22 transports the dirt and loose tomatoes that have fallen through the gap 18 toward an electronic color sorter 24, the dirt and loose tomatoes falling off the conveyor end passing the electronic color sorter. Electronic color sorter 24 may be of any suitable known type and comprises an electro-mechanical device that is normally set to hit red tomatoes passing thereby. Electronic color sorters are well known expedients in tomato harvesters.

The electronic color sorter 24 detects and "hits" red tomatoes, causing them to be positioned on a loose fruit conveyor 30; everything not detected as a red tomato falls to the ground.

Plants 10 passing over dirt gap 18 are positioned on separator conveyor 16. Separator conveyor 16 transports the plants to a shaker 32 which shakes the plant to separate tomatoes therefrom. Shaker 32 may be of any known type and the use of shakers in tomato harvesters is well known. The tomatoes fall through openings (not shown) formed at the bottom of the shaker onto a cross conveyor 34 which delivers the tomatoes to loose fruit conveyor 30. The tomato vine portion of the plant is deposited onto the ground.

The tomatoes on the cross conveyor 34 are mostly red, but with some green tomatoes and some dirt.

The loose fruit conveyor 30 transports the material thereon to a second sorter. The second sorter includes a conveyor 40 having a downstream end spaced from a second electronic color sorter 36 which serves to sort ripe tomatoes from unripe tomatoes on the basis of color in much the same manner as electronic color sorter 24. A conveyor 42 receives the ripe tomatoes and transports them to the desired end location, for example an elevator (not shown) delivering the fruit to a truck accompanying the harvester.

The arrangement just described is generally conventional, with the electronic color sorter 36 normally being set to hit everything but red tomatoes. These rejected tomatoes in the conventional arrangement end up on the ground.

It will be appreciated that such a conventional arrangement can result in unintentional culling or discard of ripe tomatoes. Reasons for this are indicated above.

A novel feature of the apparatus of this invention is the incorporation of a transport conveyor 50 into the system. The transport conveyor 50 includes a generally horizontally disposed transport conveyor section 52 adjacent to sorter 36 and disposed under loose fruit conveyor 30 and a generally vertically disposed transport conveyor section 54.

In this system the electronic color sorter 36 directs cull material including green tomatoes and dirt into a chute 56 which in turn delivers the culled material to the upper surface of transport conveyor 50. Red tomatoes are positioned on conveyor 42. A barrier 58 associated with conveyor 42 ensures that red tomatoes do not inadvertently fall into the chute from conveyor 42.

Transport conveyor 50 delivers the culled tomatoes and possibly other material back to the upper surface of first sorter conveyor or dirt conveyor 22 so that the culls are essentially reprocessed through the system. Tomatoes accepted by electronic color sorter 24 during the second pass fall onto loose fruit conveyor 30 and move through the rest of the system. The electronic color sorters in other words treat the culls just as they do the tomatoes initially passing therethrough.

One of the more subtle aspects of this system is the fact that the sorters can be adjusted to take advantage of the reject/resort system.

There is not a definitive difference between a dirt clod and a red tomato, in the way the electronic sorters "see" them. Consequently, both sorters will accidently hit red tomatoes and dirt.

The sorter 36 can be tuned or adjusted to eliminate or reject more dirt than in its nominal settings. The more dirt the electronic color sorter 36 is adjusted to reject, the higher volume of red tomatoes accidently rejected. Because the electronic color sorter 24 is tuned to hit all red tomatoes, the good red tomatoes that are rejected by electronic color sorter 36 are in effect saved by the electronic color sorter 24.

The electronic color sorter 24 can also be "tuned" or adjusted to kick more red tomatoes than in its nominal setting. The more red tomatoes the electronic dirt belt receives, the higher the volume of dirt accidentally hit. The desired effect is to save virtually all red tomatoes that may otherwise have fallen to the ground if the electronic color sorter 24 was adjusted to its nominal setting. Consequently, more dirt may accidentally be kicked in by the sorter 24. However, since the electronic color sorter 36 is set to hit more dirt, there will be minimal dirt ending up on the rear side sort and almost no red tomatoes ending up on the ground as a result of sorter function.

FIGS. 4 and 5 disclose an alternative embodiment in which a transport conveyor 50 delivers culls from chute 56 along a generally horizontal path of movement to a transfer conveyor 70. Transfer conveyor 70 delivers the culls to separator conveyor 14. The culls are processed in the same manner as the tomatoes and other material of plants just severed from the ground and transported by the separator conveyor 14.

The invention claimed is:

1. Harvester apparatus for separating ripe fruit from harvested plants, said harvester apparatus comprising, in combination:
    a first separator for separating loose fruit from harvested plants;
    a first sorter for sorting loose fruit separated by the first separator by detecting the color thereof and selectively accepting or rejecting the loose fruit separated by the first separator on the basis of the detected color thereof;
    a second separator for receiving harvested plants from the first separator after loose fruit has been separated therefrom by said first separator for separating additional loose fruit from the harvested plants received thereby from the first separator;
    a second sorter for receiving loose fruit from said second separator and sorting the loose fruit received from said second separator by detecting the color of the loose fruit received from the second separator and selectively accepting or rejecting the loose fruit received from the second separator on the basis of the detected color thereof; and
    transport means for transporting loose fruit rejected by said second sorter to said first sorter for further sorting by said first sorter.

2. The harvester apparatus according to claim 1 wherein said transport means comprises a transport conveyor extending between said first sorter and said second sorter.

3. The harvester apparatus according to claim 2 wherein said transport conveyor includes a generally horizontally disposed transport conveyor section adjacent to said second sorter for supporting and conveying loose fruit rejected by and received from said second sorter and a generally vertically disposed transport conveyor section for receiving loose fruit from said generally horizontally disposed transport conveyor section and elevating the loose fruit received from said generating horizontally disposed transport conveyor section.

4. The harvester apparatus according to claim 3 wherein said first sorter includes a first sorter conveyor, said generally vertically disposed transport conveyor section depositing loose fruit on said first sorter conveyor.

5. The harvester apparatus according to claim 4 wherein said first separator includes first and second separator conveyors defining a gap therebetween allowing for the passage therethrough of loose fruit, said gap being located over said first sorter conveyor.

6. The harvester apparatus according to claim 5 wherein one of said first and second separator conveyors has a discharge end located at said second separator for delivering harvested plants to said second separator after loose fruit has fallen through said gap and been separated therefrom.

7. The harvester apparatus according to claim 1 additionally comprising a loose fruit conveyor for receiving loose fruit from both said first separator and said second separator and for transporting the loose fruit from said first separator and said second separator to said second sorter.

8. A method for separating ripe fruit from harvested plants, said method including the steps of:

at a first separator locator, separating loose fruit from harvested plants;

delivering the loose fruit from said first separator location to a first sorter location;

at said first sorter location, detecting the color of the loose fruit received from the first separator location;

at said first sorter location, selectively accepting or rejecting the loose fruit received from the first separator location on the basis of the detected color thereof;

conveying from said first separator location harvested plants after loose fruit has been separated therefrom at said first separator location;

at said second separator location, separating additional loose fruit from the harvested plants conveyed from said first separator location to said second separator location;

delivering the additional loose fruit from said second separator location to a second sorter location;

at said second sorter location, detecting the color of the loose fruit received from the second separator location;

at said second sorter location, selectively accepting or rejecting the loose fruit received from the second separator location on the basis of the detected color thereof;

transporting loose fruit rejected at said second separator location from said second separator location to said first sorter location; and at said first sorter location, further sorting the loose fruit transported from said second sorter location to said first sorter location.

9. The method according to claim 8 including the additional step of separating dirt from said harvested plants at said first separator location.

10. The method according to claim 8 wherein said steps of detecting color of loose fruit and selectively accepting or rejecting loose fruit at said first and second sorter locations is carried out by electronic color sorters located at said first and second sorter locations.

11. The method according to claim 10 including the step of selectively varying the sensitivity of at least one of said electronic color sorters.

12. The method according to claim 8 including the additional step of conveying loose fruit from both said first separator location and said second separator location to said second sorter location.

13. The method according to claim 8 wherein said step of further sorting the loose fruit transported from said second sorter location to said first sorter location includes detecting the color thereof and selectively accepting or rejecting the loose fruit transported from said second sorter location to the first sorter location on the basis of detected color.

14. The method according to claim 13 including the additional step of conveying the loose fruit transported from said second sorter location to said first sorter location back to the second sorter location after acceptance thereof at said first sorter location.

* * * * *